United States Patent

[11] 3,611,083

[72] Inventor Edwin H. Halsted
    Dayton, Ohio
[21] Appl. No. 88,830
[22] Filed Nov. 12, 1970
[45] Patented Oct. 5, 1971
[73] Assignee General Motors Corporation
    Detroit, Mich.

[54] REVERSING CONTROL CIRCUIT FOR A SINGLE-PHASE ALTERNATING CURRENT INDUCTION MOTOR
1 Claim, 1 Drawing Fig.

[52] U.S. Cl. .................................................. 318/207 A,
    318/266, 318/289
[51] Int. Cl. ...................................................... H02p 1/42
[50] Field of Search ........................................... 318/207 R,
    207 A, 207 B, 266, 289

[56] References Cited
UNITED STATES PATENTS

| | | | |
|---|---|---|---|
| 1,951,835 | 3/1934 | Morris.......................... | 318/207 A |
| 2,545,639 | 3/1951 | Wolff et al...................... | 318/207 A |
| 2,661,450 | 12/1953 | Moler........................... | 318/207 A |

Primary Examiner—Gene Z. Rubinson
Attorneys—Eugene W. Christen, Creighton R. Meland and Richard G. Stahr ABSTRACT: A reversing control circuit for a single-phase alternating current induction motor operatively connected to a driven member which is operated thereby from an initial position to an extreme position at which it encounters a restraint of sufficient force to stall the motor and returned to the initial position. Upon the closing of a momentary contact switch, supply potential is applied therethrough across the main motor winding and also across the motor first direction phase winding through one movable contact and the corresponding alternate condition stationary contact of a double pole-double throw switch, maintained in the alternate condition of operation by the driven member in the initial position, and a series centrifugal switch. The energized motor rotates in the first direction to operate the driven member toward the extreme position and away from the double pole-double throw switch which returns to the normal condition of operation to connect the motor main winding across the supply potential through a movable contact and the corresponding normal condition stationary contact thereof and the centrifugal switch opens to disconnect the motor first direction phase winding. When the driven member has been operated to the extreme position at which it encounters a restraint of sufficient force to stall the motor, the centrifugal switch closes to apply supply potential across the motor second direction phase winding through a movable contact and the corresponding normal condition stationary contact of the double pole-double throw switch to reverse the direction of rotation of the motor to return the driven member to the initial position at which the double pole-double throw switch is operated thereby to the alternate condition in which all motor circuits are open.

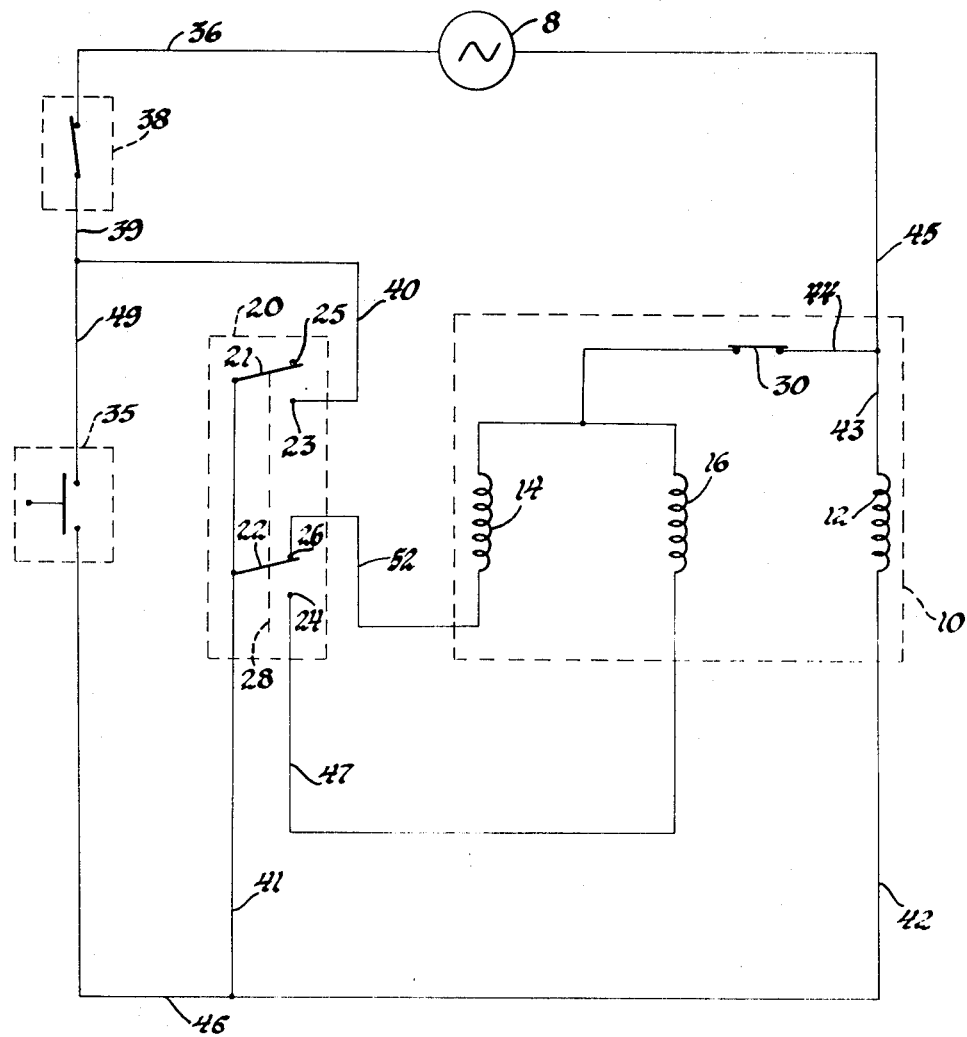

REVERSING CONTROL CIRCUIT FOR A SINGLE-PHASE ALTERNATING CURRENT INDUCTION MOTOR

This invention is directed to a reversing control circuit for a single-phase alternating current induction motor and, more specifically, to a reversing control circuit which automatically reverses the direction of rotation of a single-phase alternating current induction motor when a driven member which is operated thereby encounters a restraint of sufficient force to stall the motor to return the driven member to the initial position.

To effect the automatic reversal of a driving motor when a driven member is operated thereby to an extreme position to return the driven member to the initial position and disconnect the motor, a limit switch operatively engaged by the driven member at each extreme of travel thereof is normally employed. However, with some applications, the extreme position of the driven member may be different for each cycle of operation, consequently, the use of a limit switch in operative engagement with the driven member at the extreme position is not feasible. One example of an application of this type is in baling machinery wherein material to be baled is introduced into a hopper and is compressed to a smaller volume by a plunger which is operated by an electric motor from an initial position, to an extreme position and returned to the initial position in preparation for the introduction of more material to be baled into the hopper. With applications of this type, the extreme position of the plunger is different for each cycle of operation as additional material to be baled is introduced into the hopper.

It is, therefore, an object of this invention to provide as improved reversing control circuit for a single-phase alternating current induction motor.

It is another object of this invention to provide an improved reversing control circuit for a single-phase alternating current induction motor which automatically reverses the direction of rotation of the motor when a driven member has been operated thereby to an extreme position at which it encounters a restraint of sufficient force to stall the motor.

In accordance with this invention, a reversing control circuit is provided for a single-phase alternating current induction motor operatively connected to a driven member which is operated thereby from an initial position to an extreme position at which it encounters a restraint of sufficient force to stall the motor and returned to the initial position wherein the motor second direction phase winding is connected across the supply potential through a centrifugal switch which closes when the motor stalls and a movable contact and a normal operating condition stationary contact of a conventional double pole-double throw electrical switch in the normal condition of operation whereby, since the motor main winding is connected across the supply potential through another movable contact and the corresponding normal condition stationary contact of the double pole electrical switch, the direction of rotation of the motor is reversed to return the driven member to the initial position at which it operates the double pole-double throw switch to the alternate position of operation in which the motor circuits are open.

For a better understanding of the present invention together with additional objects, advantages and features thereof, reference is made to the following description and accompanying single FIGURE drawing which sets forth the reversing control circuit for a single-phase alternating current induction motor of this invention in schematic form.

Referring to the drawing, the reversing control circuit for a single-phase alternating current induction motor of this invention is set forth in combination with a source of alternating current supply potential 8; a single-phase induction motor 10 having a main winding 12, a first direction phase winding 14 and a second direction phase winding 16; a double pole-double throw electrical switch 20 having two electrically interconnected movable contacts 21 and 22 simultaneously operable between normal and alternate conditions of operation, each of which is arranged to be in electrical engagement with a corresponding normal condition stationary contact, respective stationary contacts 23 and 24, when in the normal condition of operation and in electrical engagement with a corresponding alternate condition stationary contact, respective stationary contacts 25 and 26, when operated to the alternate condition of operation; a normally closed speed sensitive electrical switch 30 operable to an electrical circuit open condition in response to motor 10 reaching a predetermined speed and a momentary contact type electrical switch 35.

The reversing control circuit of this invention is particularly adaptable for applications with which the controlled motor is operatively connected to a driven member which is operated thereby from an initial position to an extreme position at which it encounters a restraint of sufficient magnitude to stall the motor and returned to the initial position. One example of a typical application of this type is a baling machine or any other equipment designed to compact or compress successive quantities of a selected material in which the driven member is the compressing plunger or ram driven by the motor. As the applications for the reversing control circuit of this invention are so varied and in the interest of reducing drawing complexity, only the circuit is set forth in schematic form.

Double pole-double throw electrical switch 20 may be any one of the many commercially available switches of this type having two electrically interconnected movable contacts, spring biased to a normal condition of operation in which each is in electrical engagement with a corresponding normal condition stationary contact, in operative relationship with an external operating lever or plunger which, under the influence of an external force, operates the movable contacts to an alternate condition of operation in which each is in electrical engagement with a corresponding alternate condition stationary contact. Referring to the FIGURE, double pole-double throw electrical switch 20 is provided with two electrically interconnected movable contacts 21 and 22 which are simultaneously operable between a normal condition of operation and an alternate condition of operation, in which it is shown in the FIGURE, through the operation of an external operating lever or plunger 28. Each of movable contacts 21 and 22 is arranged to be in electrical engagement with a corresponding normal condition stationary contact, respective stationary contacts 23 and 24, when in the normal condition of operation and in electrical engagement with a corresponding alternate condition stationary contact, respective stationary contacts 25 and 26, when operated to the alternate condition of operation. Double pole-double throw electrical switch 20 is mounted in a position or location in which operating lever or plunger 28 is engaged by the driven member, not shown, in the initial position which provides the external force which acts thereupon to operate the movable contacts to the alternate condition of operation in a manner well known in the limit switch application art.

Normally closed speed sensitive electrical switch 30 may be any one of the conventional and commercially available centrifugal switches well known in the single-phase alternating current induction motor art which are mounted upon the motor shaft and are responsive to the motor reaching a predetermined speed to operate the normally closed contacts thereof to the electrical circuit open condition. This switch may also be any externally operated speed sensitive electrical switch which senses the speed of motor 10 to operate the normally closed contacts thereof to the electrical circuit open condition.

Momentary contact type electrical "start" switch 35 may be any one of the many "push button" type switches which are commercially available and well known in the art or any other suitable type electrical switch.

Motor main winding 12 is connected across the source of alternating current supply potential 8 through a selected one of the movable contacts and the corresponding normal condition stationary contact of double pole-double throw switch 20. In the FIGURE, this circuit may be traced from one side of the source of alternating current supply potential 8, through lead 36, the normally closed contacts of "stop" switch 38, leads 39 and 40, movable contact 21 and corresponding normal condition stationary contact 23 of double pole-double throw electrical switch 20 when in the normal condition of operation, leads 41 and 42, motor main winding 12 and leads 43 and 45 to the other side of the source of alternating current supply potential 8. Normally closed "stop" switch 38 may be any conventional, manually operated single pole-single throw commercially available electrical switch well known in the art.

The motor second direction phase winding 16 and speed sensitive electrical switch 30 are connected in series across the source of alternating current supply potential 8 through the other one of the movable contacts and the corresponding normal condition stationary contact of double pole-double throw electrical switch 20. In the FIGURE, this circuit may be traced from one side of the source of alternating current supply potential 8, through lead 36, the normally closed contacts of "stop" switch 38, leads 39 and 40, movable contact 21 and corresponding normal condition stationary contact 23 and movable contact 22 and corresponding normal condition stationary contact 24 of double pole-double throw electrical switch 20 when in the normal condition of operation, lead 47, motor second direction phase winding 16, centrifugal switch 30 and lead 44 to the other side of the source of alternating current supply potential 8.

The motor first direction phase winding 14 and speed sensitive electrical switch 30 are connected in series across the source of alternating current supply potential 8 through a selected one of the movable contacts and the corresponding alternate condition stationary contact of double pole-double throw electrical switch 20. In the FIGURE, this circuit may be traced from one side of the source of alternating current supply potential 8, through lead 36, the normally closed contacts of "stop" switch 38, lead 49, normally open momentary contact "start" switch 35, when closed, leads 46 and 41, movable contact 22 and corresponding alternate condition stationary contact 26 of double pole-double throw electrical switch 20 when in the alternate condition of operation, leads 51 and 52, motor first direction phase winding 14, centrifugal switch 30 and leads 45 and 46 to the other side of the source of alternating current supply potential 8.

Upon the closure of momentary contact type electrical switch 35, the main motor winding 12 and the motor first direction phase winding 14 are connected in parallel across the source of alternating current supply potential 8 through the contacts of momentary contact type electrical switch 35. In the FIGURE, this circuit may be traced from one side of the source of alternating current supply potential 8, through lead 36, the normally closed contacts of "stop" switch 38, leads 39 and 49, normally open momentary contact type "start" switch 35 and lead 42 in series, thence through a first parallel branch comprising main motor winding 12 and lead 43, and a second parallel branch comprising lead 41, movable contact 22 and corresponding alternate condition stationary contact 26 of double pole-double throw switch 20, motor first direction phase winding 14 and centrifugal switch 30 and then through lead 44 to the other side of the source of alternating current supply potential 8.

Upon the operation of momentary contact type "start" switch 35 to the electrical circuit closed condition, an energizing circuit for motor main winding 12 is completed therethrough and an energizing circuit for the motor 10 first direction phase winding 14 is completed therethrough and through movable contact 22 and corresponding alternate condition stationary contact 26 of double pole-double throw electrical switch 20 across the source of alternating current supply potential 8. Consequently, motor 10 begins to revolve in the direction which will operate the driven member, not shown, from the initial position toward the extreme position. When motor 10 has reached a predetermined speed, centrifugal switch 30 operates to the electrical circuit open condition in a manner well known in the art to interrupt the energizing circuit for the motor first direction phase winding 14. However, motor 10 continues to rotate in the same direction as the energizing circuit for motor main field winding 12 is maintained through momentary contact start switch 35. When the driven member has been operated a sufficient distance to release the force upon operating lever or plunger 28 of double pole-double throw electrical switch 20, movable contacts 21 and 22 thereof are spring biased in a direction which will transfer these contacts to the normal condition of operation in which each is in electrical engagement with the corresponding normal condition stationary contact, respective stationary contacts 23 and 24. At this time, the energizing circuit for the main motor winding 12 is maintained through movable contact 21 and the corresponding normal condition stationary contact 23 of double pole-double throw electrical switch 20.

When the driven member encounters a restraint of sufficient force to stall motor 10 at the extreme position, centrifugal switch 30 operates to the electrical circuit closed condition to complete an energizing circuit for the motor second direction phase winding 16 through movable contact 22 and the corresponding normal condition stationary contact 24 of double pole-double throw electrical switch 20. Consequently, the direction of rotation of motor 10 is reversed to return the driven member in a direction toward the initial position. When motor 10 has reached the predetermined speed, centrifugal switch 30 operates to the electrical circuit open condition to interrupt the energizing circuit for the motor second direction phase winding 16. However motor 10 continues to rotate in the same direction as the energizing circuit for motor main field winding 12 is maintained through double pole-double throw switch 20.

When the driven member has returned to the initial position and engages operating lever or plunger 28 of double pole-double throw switch 20, the force produced thereby operates movable contacts 21 and 22 to the alternate condition of operation. In this condition, the energizing circuit for motor main winding 12 is interrupted by movable contact 21 of double pole-double throw electrical switch 20 to stop motor 10 with the driven member in the initial position.

The single pole-single throw "stop" switch 38 may be included in the circuit as shown in the FIGURE to provide an emergency stop feature. With motor 10 operating in either direction of rotation, the operation of "stop" switch 38 to the electrical circuit open condition interrupts the energizing circuit for motor 10.

While specific electrical devices have been described in this specification, it is to be specifically understood that alternate electrical devices having similar electrical characteristics may be employed.

While a preferred embodiment of the present invention has been shown and described, it will be obvious to those skilled in the art that various modifications and substitutions may be made without departing from the spirit of the invention which is to be limited only within the scope of the appended claim.

What is claimed is:

1. A reversing control circuit for a single-phase alternating current induction motor comprising in combination with a source of alternating current supply potential and a single-phase induction motor having a main winding, a first direction phase winding and a second direction phase winding operatively connected to a driven member which is operated thereby from an initial position to an extreme position at which it encounters a restraint of sufficient force to stall the motor and returned to the initial position, a double pole-double throw electrical switch having two electrically interconnected movable contacts simultaneously operable between normal and alternate conditions of operation, each of which is arranged to be in electrical engagement with a corresponding normal condition stationary contact when in the normal condition of operation and in electrical engagement with a corresponding alternate condition stationary contact when operated to the alternate condition of operation arranged to be operated to the alternate condition of operation by said driven member when in the initial position, a normally closed speed sensitive electrical switch operable to an electrical circuit open condition in response to said motor reaching a predetermined speed, means for connecting said motor main winding across said source of alternating current supply potential through a selected one of said movable contacts and said corresponding normal condition stationary contact of said double pole-double throw electrical switch, means for connecting said motor second direction phase winding and said speed sensitive electrical switch in series across said source of alternate current supply potential through the other one of said movable contacts and said corresponding normal condition stationary contact of said double pole-double throw electrical switch, means for connecting said motor first direction phase winding and said speed sensitive electrical switch in series across said source of alternating current supply potential through a selected one of said movable contacts and said corresponding alternate condition stationary contact of said double pole-double throw electrical switch, a momentary contact type electrical switch, and means for connecting said motor main winding and said motor first direction phase winding in parallel across said source of alternating current supply potential through said momentary contact type electrical switch.